United States Patent
Shimazaki et al.

(10) Patent No.: US 12,485,805 B2
(45) Date of Patent: Dec. 2, 2025

(54) COUPLING STRUCTURE BETWEEN HEADREST STAY AND CORE MEMBER, HEADREST, AND METHOD FOR MANUFACTURING THE SAME

(71) Applicant: MATSUMOTO INDUSTRY CO., LTD., Fukuoka (JP)

(72) Inventors: Mitsuo Shimazaki, Fukuoka (JP); Josei Kuriyama, Fukuoka (JP)

(73) Assignee: MATSUMOTO INDUSTRY CO., LTD., Fukuoka (JP)

( * ) Notice: Subject to any disclaimer, the term of this patent is extended or adjusted under 35 U.S.C. 154(b) by 224 days.

(21) Appl. No.: 18/350,974

(22) Filed: Jul. 12, 2023

(65) Prior Publication Data
US 2025/0018846 A1 Jan. 16, 2025

(51) Int. Cl.
- B60N 2/42 (2006.01)
- B29C 44/12 (2006.01)
- B60N 2/427 (2006.01)
- B60N 2/48 (2006.01)
- B60N 2/80 (2018.01)
- B60R 21/055 (2006.01)

(52) U.S. Cl.
CPC ............... B60N 2/80 (2018.02); B29C 44/12 (2013.01)

(58) Field of Classification Search
CPC .................................. B60N 2/80; B60N 2/894
See application file for complete search history.

(56) References Cited

U.S. PATENT DOCUMENTS

| | | | | |
|---|---|---|---|---|
| 7,537,282 B2 * | 5/2009 | Veine | ..................... | B60N 2/888 297/216.12 |
| 7,819,480 B2 * | 10/2010 | Asbury | ..................... | A47C 7/38 297/391 |
| 8,287,040 B2 * | 10/2012 | Hojnacki | ................. | B60N 2/80 297/216.12 |
| 8,414,078 B2 * | 4/2013 | Fujita | ....................... | B60N 2/85 297/391 |

(Continued)

FOREIGN PATENT DOCUMENTS

| | | |
|---|---|---|
| JP | 2006-015826 A | 1/2006 |
| JP | 2010-269089 A | 12/2010 |
| JP | 2022-105352 A | 7/2022 |

OTHER PUBLICATIONS

Japanese Office Action mailed Jun. 2, 2023 issued in Japanese Patent Application No. 2021-000051.

*Primary Examiner* — Shin H Kim
(74) *Attorney, Agent, or Firm* — Rankin, Hill & Clark LLP (57) ABSTRACT

A fitting groove (18) is formed in one surface of a core member (13), and an elastic deformation piece (22) is provided in an overhanging state with respect to an opening of the fitting groove (18). This makes it possible to push the upper end portion of a headrest stay (12) deep into the fitting groove (18) with the elastic force of the elastic deformation piece (22) at the time of inserting and fitting of the headrest stay (12). This increases the coupling force between the upper end portion of the headrest stay (12) and the core member (13) in the front/rear and right/left directions and hence allows the upper end portion of the stay with the core member (13) to be inserted into the skin (14) without any trouble and can also stabilize the quality of a headrest (10).

6 Claims, 7 Drawing Sheets

(56) References Cited

U.S. PATENT DOCUMENTS

| | | | | |
|---|---|---|---|---|
| 8,936,310 | B2* | 1/2015 | Takayama | B60N 2/42745 |
| | | | | 297/216.12 |
| 9,283,877 | B2* | 3/2016 | Mizobata | B60N 2/824 |
| 9,663,006 | B2* | 5/2017 | Nasu | B60N 2/80 |
| 10,227,026 | B2* | 3/2019 | Takahashi | B60N 2/80 |
| 11,801,783 | B2* | 10/2023 | Soliven | B60N 2/80 |
| 11,878,615 | B2* | 1/2024 | Rabe | B21D 41/04 |
| 11,904,512 | B2* | 2/2024 | Sutton | B29C 44/0461 |
| 2001/0004167 | A1* | 6/2001 | Takeda | B60N 2/847 |
| | | | | 297/408 |
| 2005/0001463 | A1* | 1/2005 | Yetukuri | B60N 2/815 |
| | | | | 297/391 |
| 2008/0164730 | A1 | 7/2008 | Watson et al. | |
| 2010/0060066 | A1* | 3/2010 | Hojnacki | B60N 2/80 |
| | | | | 297/391 |
| 2015/0210191 | A1* | 7/2015 | Mizobata | B60N 2/812 |
| | | | | 297/410 |
| 2016/0121770 | A1* | 5/2016 | Takahashi | B60N 2/80 |
| | | | | 297/452.18 |
| 2017/0368975 | A1* | 12/2017 | Miyawaki | B60N 2/682 |
| 2018/0070749 | A1* | 3/2018 | Held | A47G 9/1054 |
| 2022/0297583 | A1* | 9/2022 | Makino | B60N 2/879 |
| 2025/0018846 | A1* | 1/2025 | Shimazaki | B60N 2/80 |

* cited by examiner

COUPLING STRUCTURE BETWEEN HEADREST STAY AND CORE MEMBER, HEADREST, AND METHOD FOR MANUFACTURING THE SAME

TECHNICAL FIELD

The present invention relates to a headrest attached to the seat back of a seat of a vehicle, and to a coupling structure between a headrest stay for the headrest and a core member, the headrest, and a method for manufacturing the same.

BACKGROUND ART

At an upper portion of the seat back of a seat of an automobile (vehicle), a headrest (head restraint) having, as a main body, a pillow portion that contacts the head of a sitting occupant is provided to protect the head of the sitting occupant. This headrest has a headrest stay with a pair of parallel right and left leg portions whose upper ends are coupled to each other directly or via a bride portion having a predetermined shape. A foam plastic-made core member is coupled to an upper end portion of the headrest stay.

A headrest is generally manufactured as follows. The upper end portion of the headrest stay is inserted into the internal space of a bag-shaped skin so as to push the core member through an opening of the bag-shaped skin. In this state, a foam plastic material is filled into the skin to mold a cushion body, thereby obtaining the headrest.

Meanwhile, as a coupling structure between the upper end portion of a headrest stay and a core member, for example, the structure disclosed in the "method for manufacturing headrest" in Patent Literature 1 is conventionally known. This structure is configured to restrict both leg portions of the headrest stay from moving in the right/left direction via restricting projections that are a pair of right and left rigid bodies disposed on a lower end portion of the core member.

CITATION LIST

Patent Literature

Patent Literature 1: Japanese Patent Application Publication No. 2006-15826

SUMMARY OF INVENTION

Technical Problem

As described above, the conventional coupling structure between the headrest stay and the core member is configured to restrict only the movement of each leg portion in the right/left direction via the pair of right and left restricting projections (rigid bodies) disposed on the lower end portion of the core member. Accordingly, the coupling force between the headrest stay and the core member in the front/rear direction is small. For this reason, when the upper end portion of the headrest stay with the core member is pushed into the skin through the opening as described above, the core member may come off from the headrest stay.

Then, as a result of diligent research, the inventor has found that all the above-described problems are solved by forming, in one surface of the foam plastic-made core member, a fitting groove in which the upper end portion of the headrest stay is inserted and fitted, providing an elastic deformation piece in an overhanging state with respect to the opening of the fitting groove, and pushing the upper end portions of the pair of leg portions of the headrest stay deep into the fitting groove with the elastic deformation piece. Thus, the inventor has completed this invention.

That is, an object of the present invention is to provide a coupling structure between a headrest stay and a core member that can increase the coupling force between the upper end portion of the headrest stay and the core member in the front/rear and right/left directions, and consequently allows the upper end portion of the headrest stay to which the core member is coupled to be inserted into the skin without any trouble in manufacturing the headrest, and can stabilize the quality of the manufactured headrest, the headrest, and a method for manufacturing the same.

Solution to Problem

An invention according to claim 1 provides a coupling structure between a headrest stay and a core member made of foam plastic, with the core member being coupled to an upper end portion of the headrest stay having a pair of parallel right and left leg portions, wherein a fitting groove having a substantially letter "U" shaped cross-section in which the upper end portion of the headrest stay is inserted and fitted is formed in one surface of the core member, an elastic deformation piece is provided in an overhanging state with respect to an opening of the fitting groove, and upper end portions of the pair of leg portions of the headrest stay are pushed deep into the fitting groove with the elastic deformation piece, the elastic deformation piece being integrally molded with the same material as the material of the core member.

Herein, the "right/left direction" is based on a state in which the headrest is installed on the seat back of a seat and refers to the right/left direction (width direction of the seat back, vehicle width direction) in that state. In addition, herein, the "front/rear direction" refers to the front/rear direction (the front/rear direction of the seat back, vehicle length direction) in this state.

The type of vehicle on which a seat to which the headrest is attached is mounted is not limited. For example, it can be adopted for an automobile, an electric train, a steam train, an airplane, or a marine vessel.

The seat may also be of any type, shape, and size as long as it has a headrest at the seat back.

This headrest includes a pillow portion as a main body that has a headrest stay as a frame. The pillow portion is formed by inserting and holding the upper end portion of the headrest stay to which the core member is coupled in a bag-shaped skin as an exterior member and then internally molding a cushion body in the internal space of the skin by foaming a foam synthetic resin material softer than the core member in a filled state. Accordingly, both leg portions of the headrest stay protrude in parallel from the lower end of the pillow portion.

The material of the headrest stay is not limited as long as the strength required for the headrest stay is satisfied. For example, any of various types of metals such as stainless steel and an aluminum alloy can be adopted. The headrest stay may be a tubular body (pipe) or a solid body.

The headrest stay may have any shape (especially, the shape of its distal end portion). For example, it is possible to adopt a substantially inverted letter "U" shape, a substantially letter "A" shape (perforated shape), or a double-cross shape. It is also possible to adopt a substantially inverted letter "U" shape in a front view or an inverted letter "J" shape in a side view.

Both leg portions are at least required such that the lower portions protruding from the pillow portion are parallel to each other.

As the material of the core member, it is possible to adopt various types of foam plastics, especially various types of hard foam plastics. For example, expanded polypropylene (EPP) may be adopted.

The core member may have any shape, such as a rectangular shape or trapezoidal shape in a plan view.

Herein, "one surface of the core member" may be any surface as long as it is an exposed surface of the core member. More specifically, based on a state in which the headrest is installed on the seat back of the seat, one surface of the core member may be the rear surface of the core member or the left or right surface of the core member in that state.

The shape of the fitting groove is changed as needed in accordance with the shape of the corresponding upper end portion of the headrest stay. For example, when the upper end portion of the headrest stay has a substantially inverted letter "U" shape, the shape of the fitting groove (the shape in a view facing one surface of the core member (fitting groove)) also becomes a substantially inverted letter "U" shape. Alternatively, when the upper end portion of the headrest stay has a substantially letter "A" shape (perforated shape), the shape of the fitting groove also becomes a substantially letter "A" shape.

The sectional shape of the fitting groove has a substantially letter "U" shape in which the headrest stay can be fitted.

The "substantially letter "U" cross-section" means that the sectional shape perpendicular to the length direction of the fitting groove is a letter "U" shape or a similar shape.

Herein, "an elastic deformation piece is provided in an overhanging state with respect to an opening of the fitting groove" means providing the core member with an elastic deformation piece so as to fit on the opening of the fitting groove from above.

With such elastic deformation pieces, the upper end portions of the pair of leg portions of the headrest stay are pushed deep into the fitting groove. That is, part of each elastic deformation piece pulled against the elastic force (spring force) is fitted from above on the headrest stay inserted and fitted in the fitting groove of the core member, and the upper end portion of the headrest stay is pushed deep into the fitting groove with the elastic force of the elastic deformation piece.

Each elastic deformation piece is a foam plastic-made member integrally molded with the core member with the same material as that of the core member.

Each elastic deformation piece may have any shape as long as at least its part is provided in an overhanging state with respect to the opening of the fitting groove. For example, the elastic deformation piece may have a hooked shape (claw shape).

The formation position of each elastic deformation piece in the core member is not limited. For example, the elastic deformation piece may be formed to protrude from a fitting groove formation wall of the core member (for example, the back portion formation wall or the opening portion formation wall).

An invention according to claim 2 provides the coupling structure between the headrest stay and the core member according to claim 1, wherein the upper end portion of the headrest stay has a substantially inverted letter "U" shape obtained by coupling upper ends of both leg portions to each other with a bridge portion, the fitting groove has a substantially inverted letter "U" shape constituted by a pair of right and left leg portion fitting groove portions parallel to each other and a bridge portion fitting groove portion that causes upper ends of the leg portion fitting groove portions to communicate with each other, and the elastic deformation pieces are disposed near openings of both leg portion fitting groove portions and near an opening of the bridge portion fitting groove portion.

The leg portion fitting groove portion on the left side is a linear groove portion on the left side of the fitting groove in which the upper end portion of the left leg portion of the headrest stay is inserted and fitted.

The leg portion fitting groove portion on the right side is a linear groove portion on the right side of the fitting groove in which the upper end portion of the right leg portion of the headrest stay is inserted and fitted.

In addition, the bridge portion fitting groove portion is a transverse-beam-like groove portion of the fitting groove in which the bridge portion of the headrest stay is inserted and fitted.

The elastic deformation pieces are respectively placed at least three positions including a position near the opening of the leg portion fitting groove portion on the left side, a position near the opening of the leg portion fitting groove portion on the left side, and a position near the opening of the bridge portion fitting groove portion.

Herein, "near an opening of the fitting groove" includes not only the opening portion (including the opening end) of the fitting groove but also a region near directly above the opening end.

An invention according to claim 3 provides a headrest, wherein the coupling structure between the headrest stay and the core member according to claim 1 or 2 is contained in a bag-shaped skin and wrapped and fixed in a cushion body made of a foam synthetic resin to make both leg portions of the headrest stay protrude in parallel from the skin.

The skin is a bag serving as the exterior member of the pillow portion that is the main body of the headrest.

The skin can be of any material. For example, the material may be any of various types of fabric (woven fabric, nonwoven fabric, or knitted fabric) or any of various types of leather (natural leather or synthetic leather).

The formation position of an opening in the skin is, for example, at a lower portion (bottom portion) of the skin.

The opening formed in the skin has any size as long as the upper end portion of the headrest stay to which the core member is coupled can be inserted into the opening. Note that the size of the opening is preferably as small as possible because, for example, when the foam molding material (foam synthetic resin material) for the cushion body is filled (or injected) into the skin and foamed in a filled state to manufacture the cushion body, the amount of filled material leaking from the opening is small.

A material for the cushion body (elastic body or buffer body) is not limited. For example, any of various types of foam synthetic resins (for example, polyurethane resin) softer than the material of the core member can be adopted.

The cushion body can be provided, for example, by filling or injecting a foam synthetic resin material into the internal space of the skin with the bridge portion disposed therein. Besides the above, a cushion body provided in advance may be packed inside the skin with the bridge portion housed therein. Also, the cushion body may be bonded to an outer peripheral surface of the bridge portion or may be fastened to the bridge portion with a string or the like.

An invention according to claim 4 provides a method for manufacturing a headrest, the method comprising a step of preparing a headrest stay having a pair of parallel right and left leg portions, a step of preparing a core member made of foam plastic provided with an elastic deformation piece configured to push an upper end portion of the headrest stay deep into a fitting groove having a substantially letter "U" shaped cross-section in an overhanging state with respect to an opening of the fitting groove, with the fitting groove in which the upper end portion of the headrest stay is inserted and fitted being formed in one surface of the core member, a step of coupling the headrest stay to the core member by inserting and fitting the upper end portion of the headrest stay in the fitting groove so as to spread out a distal end of each of the elastic deformation pieces, and a step of molding a cushion body in a skin by foaming a foam synthetic resin material in a filled state in the skin following coupling the headrest stay to the core member while holding the coupling structure portion in the skin, wherein the elastic deformation piece is integrally molded with the same material as the material of the core member.

(1) Headrest Stay Preparation Step:

A method for manufacturing a headrest stay is not limited. For example, a headrest stay is manufactured by a method of bending one steel pipe into a predetermined shape by using a bending machine. Besides this method, a headrest stay may be manufactured in a manner divided into multiple stay parts, and the manufactured stay parts may then be coupled to each other by a predetermined coupling method (for example, welding and fitting).

(2) Core Member Preparation Step:

A method for molding a core member is not limited. For example, it is possible to adopt an injection molding method, a cast molding method, or a pressure molding method. At the time of molding a core member, elastic deformation pieces are integrally molded with the same material as that of the core member.

(3) Step of Coupling Upper End Portion of Headrest Stay to Core Member:

In this step, the upper end portion of the headrest stay is inserted and fitted in the fitting groove of the core member so as to spread out the distal end of each elastic deformation piece.

(4) Cushion Body Molding Step:

In molding a cushion body, the upper end portion (the coupling structure portion of a core member) of a headrest stay to which the core member is coupled is inserted into a skin, and a foam synthetic resin material is injected and foamed in a filled state in the skin while this state is held.

Advantageous Effects of Invention

According to the coupling structure between the headrest stay and the core member according to claim 1, the fitting groove in which the upper end portion of the headrest stay is inserted and fitted is formed in one surface of the foam plastic-made core member, and the elastic deformation piece is provided in an overhanging state with respect to the opening of the fitting groove.

Accordingly, when the headrest stay is inserted and fitted in the fitting groove of the core member, part of the elastic deformation piece pulled against the elastic force (spring force) is fitted from above on the upper end portion of the headrest stay. As a result, the elastic force of each elastic deformation piece acts to push the upper end portion of the headrest stay deep into the fitting groove.

This makes it possible to increase the coupling force between the upper end portion of the headrest stay and the core member in the front/rear and right/left directions to allow the upper end portion of the headrest stay to which the core member is coupled to be inserted into the skin without any trouble at the time of manufacturing a headrest. In addition, it is possible to stabilize the quality of the manufactured headrest (improvement in quality).

Note that the conventional coupling structure between the headrest stay and the core member is configured to restrict only the movement of each leg portion in the right/left direction via the pair of right and left restricting projections (rigid bodies) disposed on the lower end portion of the core member. For this reason, the coupling force between the headrest stay and the core member in the front/rear direction is small, and hence the core member may come off from the headrest stay when the upper end portion of the headrest stay with the core member is pushed into the skin through the opening. The present invention solves this problem.

In particular, according to the description in claim 2, as the headrest stay, a headrest stay having a substantially inverted letter "U" shape with the upper ends of both leg portions being coupled to each other with a bridge portion is adopted. In addition, as the fitting grove of the core member, a fitting groove having an inverted letter "U" shape constituted by a pair of right and left leg portion fitting groove portions and a bridge portion fitting groove portion is adopted. Furthermore, the elastic deformation pieces are arranged in a triangular arrangement near the openings of both leg portion fitting groove portions and the opening of the bridge portion fitting groove portion.

As a result, the coupling force between the upper end portion of the headrest stay and the core member via the fitting groove can be further increased.

Further, according to the headrest described in claim 3, since the coupling structure between the headrest stay and the core member according to claim 1 is contained in the skin and wrapped and fixed in the cushion body made of the foamed synthetic resin, it is possible to increase the coupling force between the upper end portion of the headrest stay and the core member in the front/rear and right/left directions.

This makes it possible to insert the upper end portion of the headrest stay to which the core member is coupled into the skin without any trouble at the time of manufacturing a headrest and also stabilize the quality of the manufactured headrest.

Moreover, according to the method for manufacturing the headrest described in claim 4, the headrest stay having the pair of parallel right and left leg portions is prepared in advance, and the foam plastic-made core member having the fitting groove formed in one surface, with the elastic deformation pieces being disposed in an overhanging state with respect to the opening is molded. At this time, the elastic deformation pieces are molded with the same material as that of the core member.

Subsequently, the upper end portion of the headrest stay is inserted and fitted in this fitting groove from the opening end so as to spread out the distal end of each elastic deformation piece, thereby coupling the headrest stay to the core member.

Next, while this coupling structure portion is held in the skin, the foam synthetic resin material is injected and foamed in a filled state in the skin to form the cushion body integrated with the coupling structure portion between the core member and the headrest stay. With this process, a headrest is manufactured.

As a result, the coupling force between the upper end portion of the headrest stay and the core member in the front/rear and right/left directions can be increased, which makes it possible to insert the upper end portion of the headrest stay to which the core member is coupled into the skin without any trouble at the time of manufacturing a headrest. In addition, it is possible to stabilize the quality of the manufactured headrest.

DESCRIPTION OF EMBODIMENTS

An example of the present invention will now be described specifically with reference to the accompanying drawings. Here, for convenience of description, an X1 direction is a front direction, an X2 direction is a rear direction, a Y1 direction is a right direction, a Y2 direction is a left direction, a Z1 direction is an up direction, and a Z2 direction is a down direction.

EXAMPLE

Figure 2:
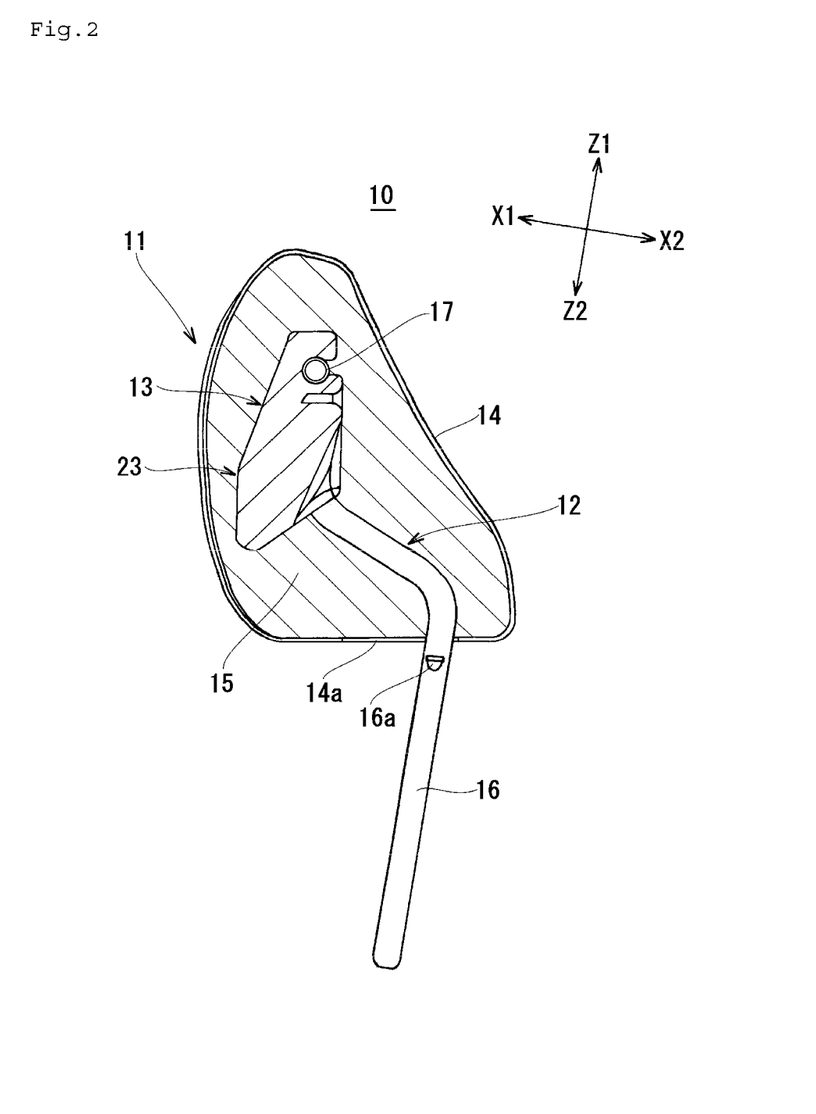
FIG. 2 is a vertical sectional view of a headrest according to Example 1 of the present invention.

Referring to FIG. 2, reference numeral 10 denotes a headrest according to Example 1 of the present invention. The headrest 10 is a head restraint that is mounted on an upper portion of the seat back of a seat of an automobile (vehicle) (not shown) and has, as a main body, a pillow portion 11 that contacts the head of a sitting occupant.

The headrest 10 includes a vertically long headrest stay 12 serving as a frame, a core member 13 coupled to an upper end portion of the headrest stay 12, a bag-shaped skin 14 that houses the upper end portion of the headrest stay 12 to which the core member 13 is coupled, and a cushion body 15 filled in the skin 14 housing the upper end portion of the headrest stay 12. Respective lower portions of a pair of parallel right and left leg portions 16 which form part of the headrest stay 12 protrude from the lower surface of the pillow portion 11.

These components will be specifically described below.

Figure 1:
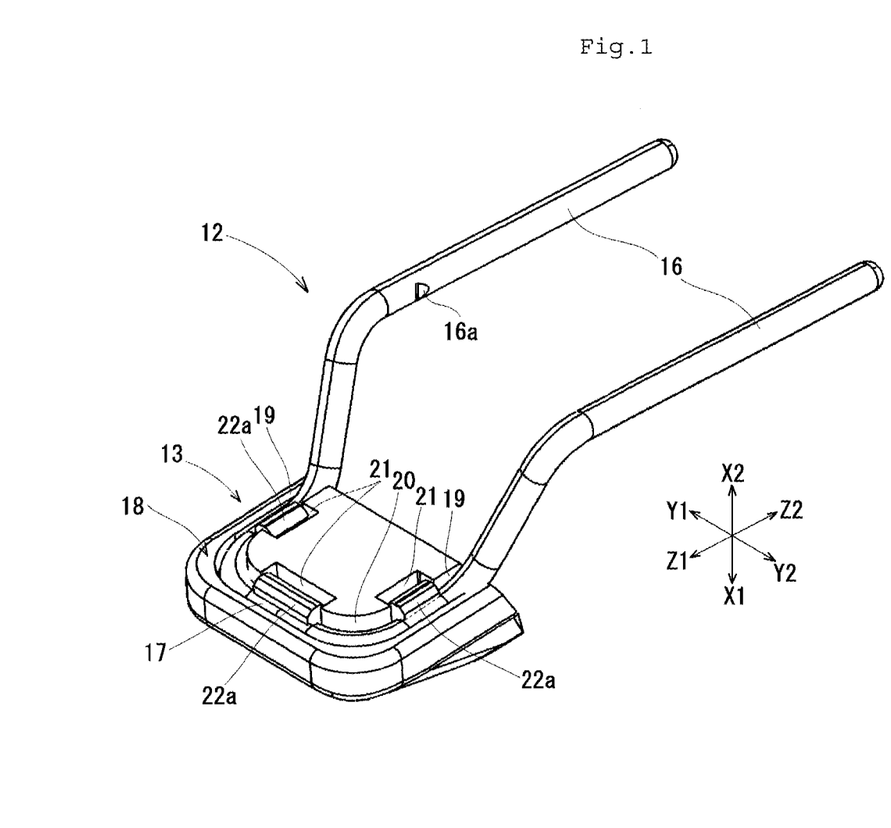
FIG. 1 is a perspective view showing a coupling structure between a headrest stay and a core member according to Example 1 of the present invention.
Figure 3:
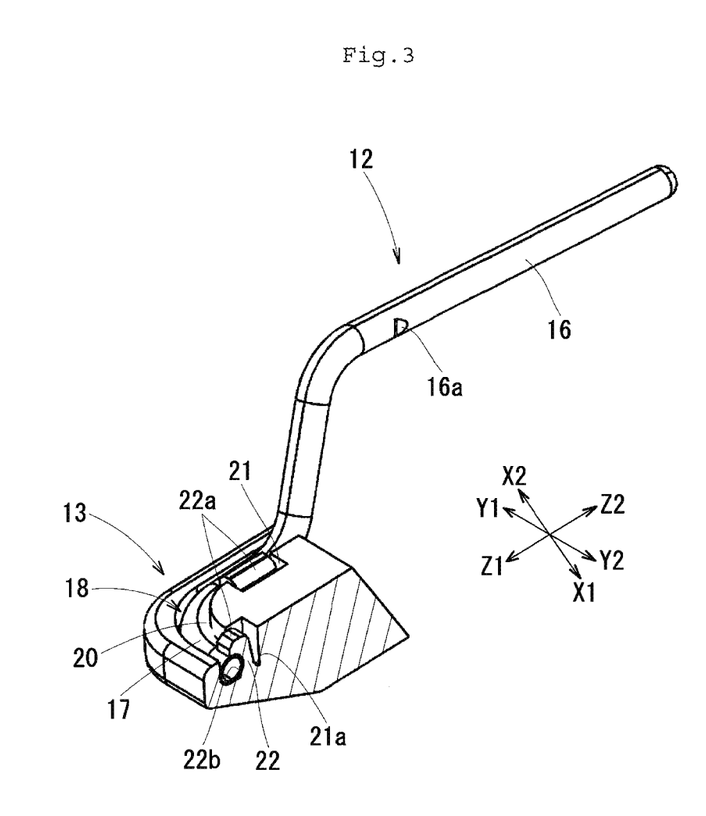
FIG. 3 is a vertical sectional perspective view showing the coupling structure between the headrest stay and the core member according to Example 1 of the present invention.
Figure 4:
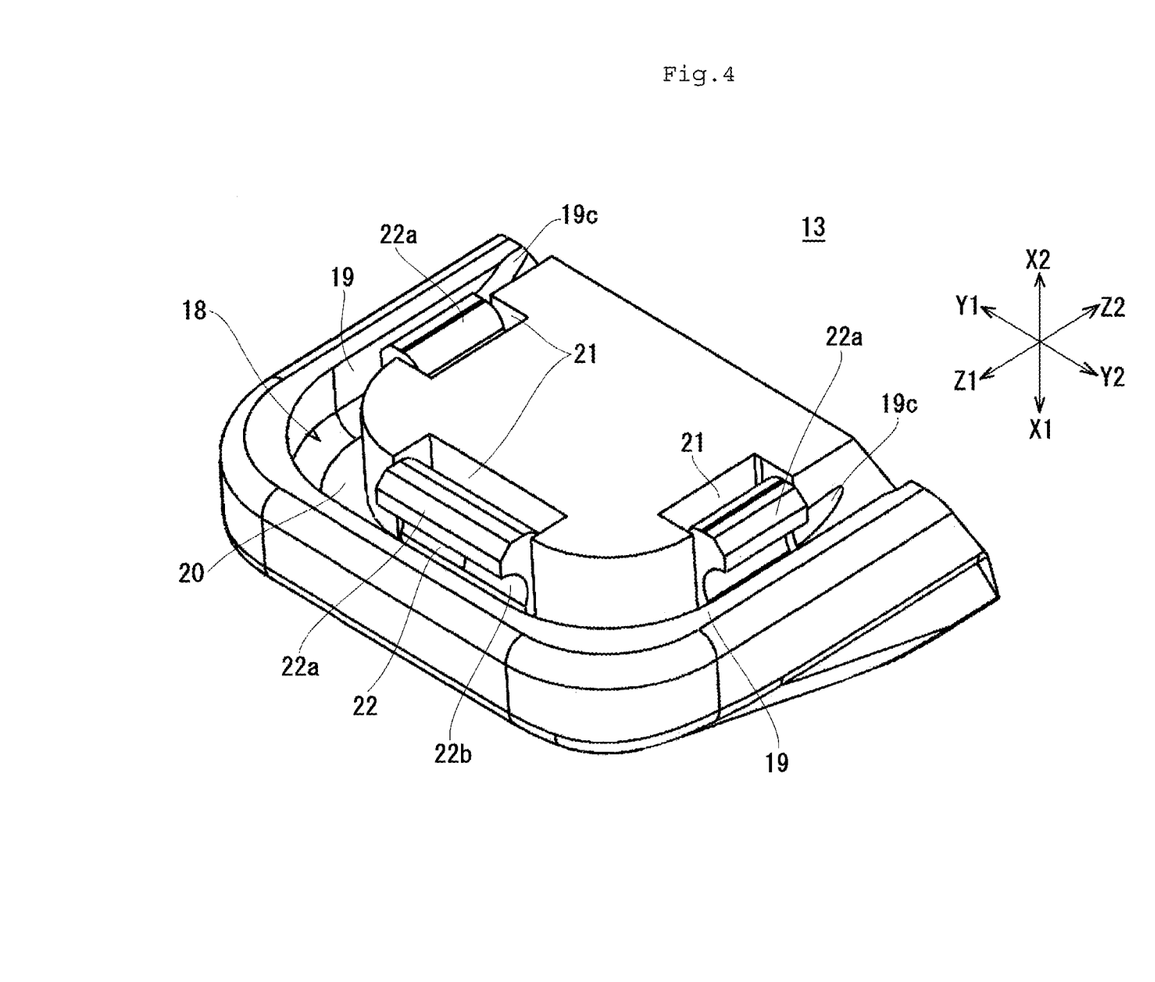
FIG. 4 is a perspective view of the core member forming part of the headrest according to Example 1 of the present invention.
Figure 5:
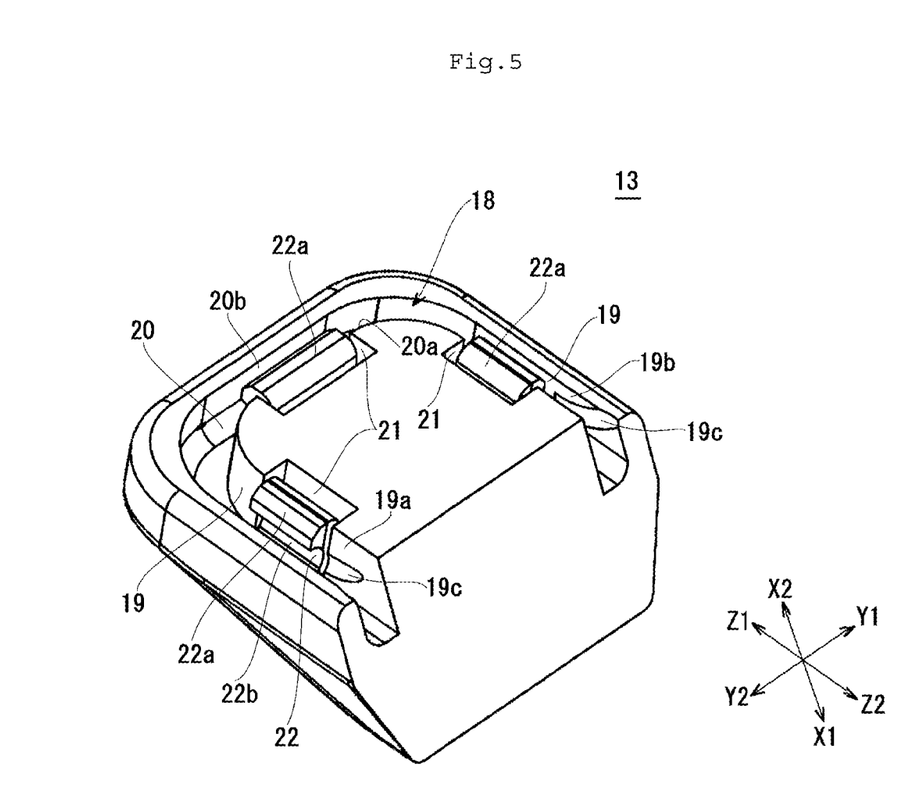
FIG. 5 is a perspective view showing the core member forming part of the headrest according to Example 1 of the present invention when viewed in another direction.

As shown in FIGS. 1 and 3, the headrest stay 12 is a member obtained by bending one long steel pipe into a substantially inverted letter "U" shape in a front view and a substantially stepped shape in a side view.

In order to implement such shape of the headrest stay 12, intermediate portions of the pair of parallel long right and left leg portions 16 are each bent into a letter "V" shape in the X1 direction. Both leg portions 16 are supported on a frame incorporated in the seat back (not shown) of the seat via two stay holders so as to be slidable in the up/down direction.

The lower portions of both leg portions 16 extend in the Z1-Z2 direction and are separated from each other in parallel in the Y1-Y2 direction so as to be slidably supportable on the respective stay holders. A predetermined number of notches 16a are formed in the opposing inner side surfaces of upper end portions of the lower portions of the respective leg portions 16 in the Z1-Z2 direction. Latch pawls of the respective stay holders (not shown) latch into the notches 16a.

Moreover, respective distal ends of both leg portions 16 are integrally coupled to each other with a bridge portion 17 extending in the Y1-Y2 direction. Accordingly, for a distal end portion of the headrest stay 12, a distal end portion of the left leg portion 16, a distal end portion of the right leg portion 16, and the bridge portion 17 are coupled into a substantially inverted letter "U" shape.

As shown in FIGS. 1 to 5, the core member 13 is a thick foam plastic body that is made of expanded polypropylene (EPP) and satisfies the strength required for the core member 13.

The core member 13 has a substantially rectangular shape that is long in the Y1-Y2 direction when facing the rear surface, and having a substantially ammunition shape in a side view.

A fitting groove 18 with a substantially letter "U" shaped cross-section in which the upper end portion of the headrest stay 12 is inserted and fitted is formed in the X2-side (rear-side) surface of the core member 13.

The fitting groove 18 is an inverted letter "U" shaped groove constituted by a pair of right and left leg portion fitting groove portions 19 parallel to each other and extending in the Z1-Z2 direction and a bridge portion fitting groove portion 20 extending in the Y1-Y2 direction which causes the upper ends of the leg portion fitting groove portions 19 to communicate with each other.

Rectangular concave portions 21 long in the length directions of corresponding groove portions are each formed in intermediate portions of inner side formation walls 19a of both leg portion fitting groove portions 19 in the length direction and in an intermediate portion of an inner side formation wall 20a of the bridge portion fitting groove portion 20 in the length direction.

Three elastic deformation pieces 22 are disposed on back side formation walls (X1-side walls) 21a of the respective rectangular concave portions 21 in an overhanging state with respect to the opening of the fitting groove 18. Each elastic deformation piece 22 is provided with a hook-shaped head portion 22a disposed near the opening of the fitting groove 18 and is configured to push the upper end portion of the headrest stay 12 to the back side of the fitting groove 18. The elastic deformation pieces 22 each are made of the same material as that of the core members 13 and integrally embedded in the back side formation walls 21a of the corresponding rectangular concave portions 21.

Each elastic deformation piece 22 is configured such that the length from the back surface of the corresponding rectangular concave portion 21 to the lower end of the hook-shaped head portion 22a is shorter than the diameter of the headrest stay 12. The elastic deformation pieces 22 are gradually inclined in the directions of corresponding outer side formation walls 19b and 20b toward the distal ends.

Recesses 19c with arcuate cross-sections for positioning the upper end portion of the headrest stay 12 that has been inserted and fitted are respectively formed in the inner side formation walls 19a and the outer side formation walls 19b of both leg portion fitting groove portions 19. Further, a recess 22*b* having a similar function is formed in the trunk portion of each elastic deformation piece 22.

As shown in FIG. 2, the skin 14 is obtained by sewing thin synthetic leather into a bag shape. An opening portion 14*a* that is long in the Y1-Y2 direction and has a size that inhibits the insertion of the core member 13 unless being compressed when a coupling structure portion 23 between the core member 13 and the upper end portion of the headrest stay 12 is inserted into the bag is formed in a lower portion (a bottom cloth portion) of the skin 14.

The cushion body 15 is a buffer body made of foam urethane (foam synthetic resin).

Figure 6:
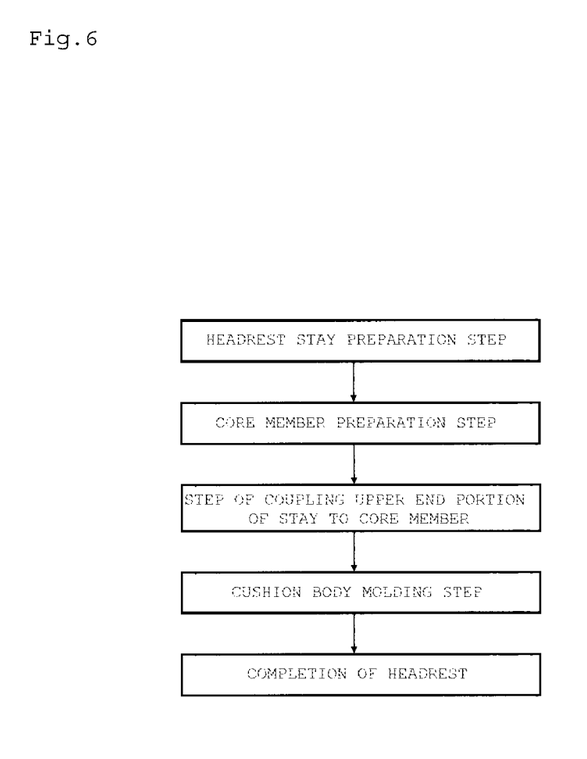
FIG. 6 is a flowchart showing a method for manufacturing a headrest according to Example 1 of the present invention.

A method for manufacturing the headrest 10 will be described next with reference to the flowchart of FIG. 6.

The headrest stay 12 having the pair of parallel right and left leg portions 16 and the bridge portion 17 is prepared in advance (headrest stay preparation step). More specifically, one steel pipe is bent in a substantially inverted letter "U" shape in a front view and a substantially stepped shape in a side view by using a bending machine to prepare the headrest stay 12.

In addition, the core member 13 having the fitting groove 18 formed in the X2-side surface is prepared (core member preparation step). More specifically, an expanded polypropylene material (injection molding material) is injected into an injection molding die (not shown). With this process, the core member 13 is injection-molded, which has the hook-shaped elastic deformation pieces 22 disposed one each in the intermediate portions of the respective sides of the fitting groove 18 having a substantially letter "U" shaped cross-section and a substantially inverted letter "U" shape in a view facing the X2-side surface of the core member 13.

Subsequently, the upper end portion of the headrest stay 12 is inserted and fitted in the fitting groove 18 of the core member 13 so as to spread out the distal end of each elastic deformation piece 22. This process will obtain the coupling structure portion 23 between the core member 13 and the upper end portion of the headrest stay 12 (step of coupling upper end portion of headrest stay to core member).

The respective elastic deformation pieces 22 are gradually inclined in the directions of the corresponding outer side formation walls 19*b* and 20*b* toward the distal ends. Accordingly, when the upper end portion of the headrest stay 12 is inserted and fitted in the fitting groove 18 so as to spread out the distal end of each elastic deformation piece 22, the upper end portion of the headrest stay 12 is pressed against the corresponding outer side formation walls 19*b* and 20*b* owing to the action of elastic force (spring force) in the directions of the corresponding outer side formation walls 19*b* and 20*b* of the respective elastic deformation pieces 22. This will increase the coupling force between the upper end of the headrest stay 12 and the core member 13 in the right/left direction (in the up-down direction in the case of the elastic deformation piece 22 on the bridge portion 17 side).

On the other hand, when the distal end portion of the headrest stay 12 is inserted and fitted in the fitting groove 18, each hook-shaped head portion 22*a* is latched onto an X1-side end portion of the upper end portion of the headrest stay 12 in an overhanging state.

In this case, since the length from the back surface of each rectangular concave portion 21 to the lower end of the head portion 22*a* of each elastic deformation piece 22 is shorter than the diameter of the headrest stay 12, when the headrest stay 12 is inserted and fitted, part (mainly a trunk portion) of each elastic deformation piece 22 is pulled against the elastic force (spring force) and fitted from above on the upper end portion of the headrest stay 12. As a result, a force to contract in the X1 direction acts on each elastic deformation piece 22, and the upper end portion of the headrest stay 12 is pushed to the back side of the fitting groove 18, thereby increasing the coupling force between the upper end portion of the headrest stay 12 and the core member 13 in the front/rear direction.

As described above, Example 1 can increase the coupling force between the upper end portion of the headrest stay 12 and the core member 13 in the front/rear and right/left directions (all directions).

Subsequently, the coupling structure portion 23 between the core member 13 and the upper end portion of the headrest stay 12 is pushed into the skin 14 through the opening portion 14*a* formed in the lower portion of the skin 14. In this case, the opening portion 14*a* of the skin 14 has a size that inhibits the insertion of the core member 13 unless being compressed. However, since the coupling force between the upper end portion of the headrest stay 12 and the core member 13 in the front/rear and right/left directions (all directions) has been increased, the coupling structure portion 23 can be inserted into the skin 14 from the upper end portion of the headrest stay 12 without causing the core member 13 to come off.

Note that the conventional coupling structure between the upper end portion of the headrest stay and the core member is configured to restrict only the movement of each leg portion in the right/left direction via the pair of right and left restricting projections (rigid bodies) disposed on the lower end portion of the core member. Accordingly, the coupling force between the headrest stay and the core member in the front/rear direction is small. This may cause the core member to come off from the upper end portion of the headrest stay when the upper end portion of the headrest stay with the core member is pushed into the skin through the opening. Example 1 has solved this problem.

Figure 7:
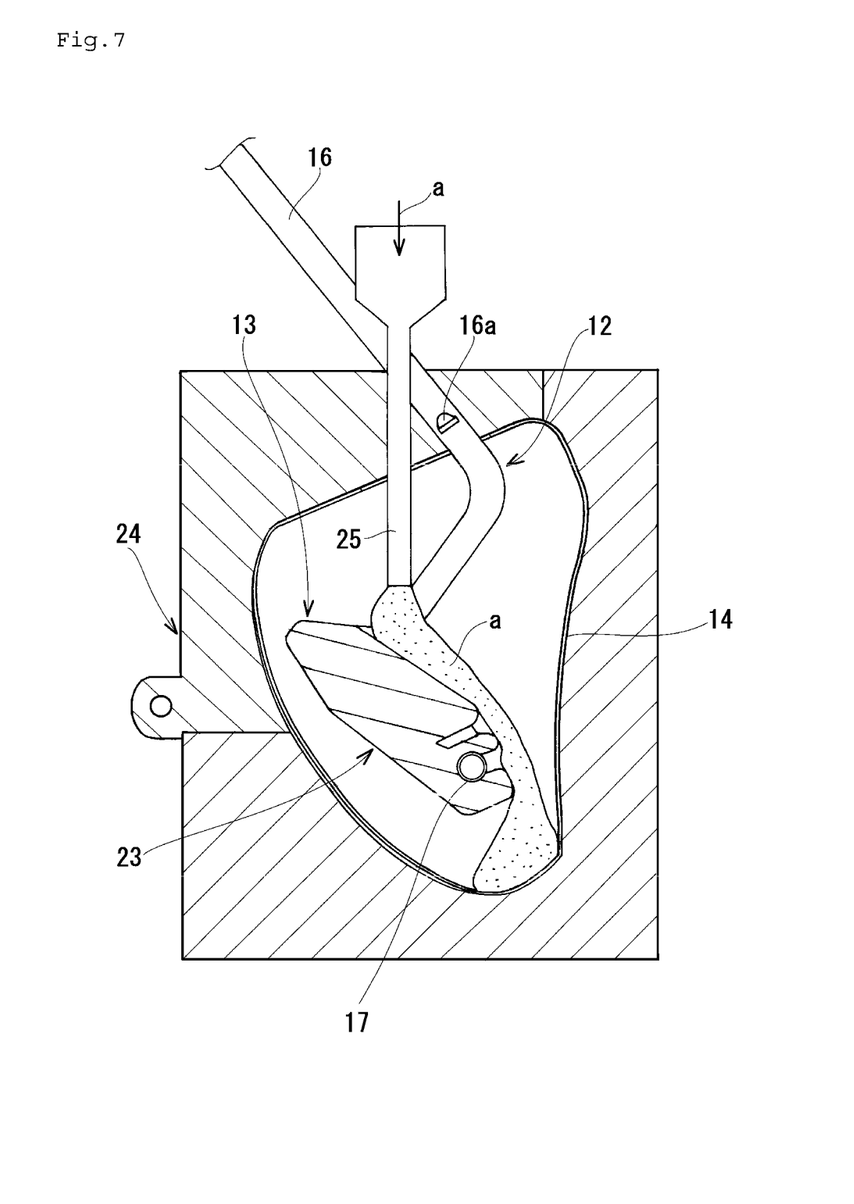
FIG. 7 is a vertical sectional view showing a cushion body molding process in the method for manufacturing a headrest according to Example 1 of the present invention.

Subsequently, as shown in FIG. 7, while the coupling structure portion 23 between the core member 13 and the upper end portion of the headrest stay 12 is held in the skin 14 set in a molding die 24, an injection nozzle 25 is inserted into the skin 14 from the opening portion 14*a*, and a foam urethane material a is injected into the skin 14 and foamed in a filled state. This causes the cushion body 15 having the core member 13 integrated with the upper end portion of the headrest stay 12 to be molded in the skin 14, thereby manufacturing the pillow portion 11 (cushion body molding step).

With the above process, the headrest 10 with stable quality and high safety can be manufactured.

The headrest 10 manufactured in this manner is used by respectively inserting the two leg portions 16 protruding from the lower portion of the pillow portion 11 into a frame incorporated in the seat bag of an automobile seat (not shown) via the two stay holders so as to be slidable in the Z1-Z2 direction.

As described above, the headrest 10 according to Example 1 adopts, as the headrest stay 12, the headrest stay having a substantially inverted letter "U" shape obtained by coupling the upper ends of both leg portions 16 to each other with the bridge portion 17. On the other hand, the headrest 10 adopts, as the fitting groove 18, the groove having an inverted letter "U" shape constituted by the pair of right and left leg portion fitting groove portions 19 and the bridge portion fitting groove portion 20. In addition, the three elastic deformation pieces 22 are arranged in a triangular arrangement near the openings of both leg portion fitting groove portions 19 and the opening of the bridge portion fitting groove portion 20. This can further increase the coupling force between the upper end portion of the headrest stay 12 and the core member 13 via the fitting groove 18.

In particular, in this case, the elastic deformation pieces 22 are respectively disposed one each in the intermediate portions of both leg portion fitting groove portions 19 and the bridge portion fitting groove portion 20 in the length directions of the fitting groove 18 having the substantially inverted letter "U" shape, and hence the coupling force of the coupling structure portion 23 between the headrest stay 12 and the core member 13 (specifically, the robustness of the coupling structure portion 23 against an impact force generated at the time of vehicle collision) can be increased as compared with a case in which the respective elastic deformation pieces 22 are disposed at portions different from the above-described intermediate portions in the length directions.

Note that the distal end of each elastic deformation piece 22 may be disposed at the position of an opening end of the fitting groove 18 or at a position slightly closer to the X1 side than the opening end when the upper end portion of the headrest stay 12 is inserted and fitted in the fitting groove 18. This is because, in the cushion body molding step shown in FIG. 7, when the foam urethane material a filled into the skin 14 flows down along the X2-side surface of the core member 13, the distal end portion of each elastic deformation piece 22 does not become an obstacle that inhibits the flow of the foam urethane material a, and consequently, no void due to the inhibition of the flow is generated in the obtained cushion body 15.

INDUSTRIAL APPLICABILITY

The present invention is useful as an art relating to a headrest stay attached to the seat back of the seat of a vehicle, a headrest using the same, and a method for manufacturing the same.

REFERENCE SIGNS LIST

10 Headrest
12 Headrest stay
13 Core member
14 Skin
15 Cushion body
16 Leg portion
17 Bridge portion
18 Fitting groove
19 Leg portion fitting groove portion
20 Bridge portion fitting groove portion
22 Elastic deformation piece
23 Coupling structure portion
a Foam urethane material (foam synthetic resin material).

The invention claimed is:

1. A coupling structure between a headrest stay and a core member made of foam plastic, with the core member being coupled to an upper end portion of the headrest stay having a pair of parallel right and left leg portions,
   wherein the core member comprises a fitting groove in which the upper end portion of the headrest stay is inserted and fitted, the fitting groove being formed in one surface of the core member and having a substantially letter "U" shaped cross-section,
   the fitting groove comprises a fitting groove formation wall and a plurality of concave portions each recessed from the fitting groove formation wall at an intermediate portion of the fitting groove in a length direction of the fitting groove,
   the core member further comprises a plurality of elastic deformation pieces each embedded in a bottom wall of each one of the plurality of concave portions,
   each one of the plurality of concave portions comprises:
      a hook-shaped head portion provided in an overhanging state with respect to an opening of the fitting groove; and
      a trunk portion extending from the bottom wall of each one of the plurality of concave portions and supporting the hook-shaped head portion, the trunk portion being gradually inclined toward the fitting groove formation wall, and
   an elastic force of the plurality of elastic deformation pieces pushes the upper end portions of the headrest stay inserted and fitted into the fitting groove deep into the fitting groove.

2. The coupling structure between the headrest stay and the core member according to claim 1, wherein the upper end portion of the headrest stay has a substantially inverted letter "U" shape obtained by coupling upper ends of both leg portions to each other with a bridge portion,
   the fitting groove has a substantially inverted letter "U" shape constituted by a pair of right and left leg portion fitting groove portions parallel to each other and a bridge portion fitting groove portion that causes upper ends of the leg portion fitting groove portions to communicate with each other, and
   the plurality of elastic deformation pieces are disposed near openings of both leg portion fitting groove portions and near an opening of the bridge portion fitting groove portion.

3. A headrest, wherein the coupling structure between the headrest stay and the core member according to claim 1 is contained in a bag-shaped skin and wrapped and fixed in a cushion body made of a foam synthetic resin to make both leg portions of the headrest stay protrude parallel in from the skin.

4. The coupling structure between the headrest stay and the core member according to claim 1, wherein the fitting groove is constituted by, in a planar view, a pair of right and left leg portion fitting groove portions parallel to each other and a bridge portion fitting groove portion which causes upper ends of the pair of right and left leg portion fitting groove portions to communicate with each other, and
   one of the plurality of elastic deformation pieces is provided at an intermediate portion of the right leg portion fitting groove portion, another one of the plurality of elastic deformation pieces is provided at an intermediate portion of the left leg portion fitting groove portion, and yet another one of the plurality of elastic deformation pieces is provided at an intermediate portion of the bridge portion fitting groove portion.

5. A method for manufacturing a headrest, the method comprising:
   a step of preparing a headrest stay having a pair of parallel right and left leg portions;
   a step of preparing a core member made of foam plastic provided with a plurality of elastic deformation pieces configured to push an upper end portion of the headrest stay deep into a fitting groove having a substantially letter "U" shaped cross-section, the fitting groove being formed in one surface of the core member;
   a step of coupling the headrest stay to the core member by inserting and fitting the upper end portion of the headrest stay in the fitting groove so as to spread out a distal end of each one of the plurality of elastic deformation pieces; and a step of molding a cushion body in a skin by foaming a foam synthetic resin material in a filled state in the skin following coupling the headrest stay to the core member while holding the coupling structure portion in the skin, wherein the fitting groove comprises a fitting groove formation wall and a plurality of concave portions each recessed from the fitting groove formation wall at an intermediate portion of the fitting groove in a length direction of the fitting groove, each one of the plurality of elastic deformation pieces is embedded in a bottom wall of each one of the plurality of concave portions, each one of the plurality of elastic deformation pieces comprises:

a hook-shaped head portion provided in an overhanging state with respect to an opening of the fitting groove; and    a trunk portion extending from the bottom wall of each one of the plurality of concave portions and supporting the hook-shaped head portion, the trunk portion being gradually inclined toward the fitting groove formation wall, and an elastic force of the plurality of elastic deformation pieces pushes the upper end portions of the headrest stay inserted and fitted into the fitting groove deep into the fitting groove.

6. The method according to claim 5, wherein the fitting groove is constituted by, in a planar view, a pair of right and left leg portion fitting groove portions parallel to each other and a bridge portion fitting groove portion which causes upper ends of the pair of right and left leg portion fitting groove portions to communicate with each other, and    one of the plurality of elastic deformation pieces is provided at an intermediate portion of the right leg portion fitting groove portion, another one of the plurality of elastic deformation pieces is provided at an intermediate portion of the left leg portion fitting groove portion, and yet another one of the plurality of elastic deformation pieces is provided at an intermediate portion of the bridge portion fitting groove portion.

\* \* \* \* \*